United States Patent
Nielsen

(10) Patent No.: US 7,830,903 B2
(45) Date of Patent: *Nov. 9, 2010

(54) METHOD AND APPARATUS FOR SCHEDULING PACKETS AND/OR CELLS

(75) Inventor: Jacob V. Nielsen, Virum (DK)

(73) Assignee: Forestay Research, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/784,370

(22) Filed: May 20, 2010

(65) Prior Publication Data

US 2010/0232449 A1    Sep. 16, 2010

Related U.S. Application Data

(63) Continuation of application No. 12/178,839, filed on Jul. 24, 2008, now Pat. No. 7,738,472, which is a continuation of application No. 11/029,624, filed on Jan. 6, 2005, now Pat. No. 7,408,947.

(51) Int. Cl.
  *H04L 12/28* (2006.01)
  *H04B 7/212* (2006.01)
(52) U.S. Cl. .................... 370/412; 370/414; 370/444
(58) Field of Classification Search ............... 370/412, 370/414, 444
See application file for complete search history.

(56) References Cited

U.S. PATENT DOCUMENTS

| | | | |
|---|---|---|---|
| 5,267,235 A | 11/1993 | Thacker | |
| 5,500,858 A | 3/1996 | McKeown | |
| 6,515,991 B1 | 2/2003 | McKeown | |
| 6,633,568 B1 | 10/2003 | Han et al. | |
| 6,721,273 B1 | 4/2004 | Lyon | |
| 6,813,274 B1 | 11/2004 | Suzuki et al. | |
| 6,993,018 B1 | 1/2006 | Horlin et al. | |
| 7,016,365 B1 | 3/2006 | Grow et al. | |
| 7,023,840 B2 | 4/2006 | Golla et al. | |
| 7,035,273 B1 | 4/2006 | Pannell et al. | |
| 7,088,710 B1 | 8/2006 | Johnson et al. | |
| 7,110,415 B1 | 9/2006 | Walsh et al. | |
| 7,161,906 B2 | 1/2007 | Dell et al. | |
| 7,203,170 B2 | 4/2007 | Dooley | |
| 7,321,554 B1 | 1/2008 | Walsh et al. | |
| 7,327,747 B2 | 2/2008 | Boduch et al. | |

*Primary Examiner*—Andrew Lee
(74) *Attorney, Agent, or Firm*—SoCal IP Law Group LLP; Steven C. Sereboff; John E. Gunther

(57) ABSTRACT

A system and method of switching data using a switch device that includes a plurality of input ports, a plurality of switch units, and a plurality of output ports. Each input port storing data to be sent may generate a request to output data to each of the output ports to which stored data is to be sent, wherein each request identifies a specific one of the plurality of switch units to be used to transfer the data from the corresponding input port to the corresponding output port. Grants may be generated per output port per switch unit. Grants may be accepted per input port per switch unit. Data may be outputted from the respective input ports to the respective output ports, based on the accepted grants, utilizing the switch units identified in the requests corresponding to the accepted grants.

13 Claims, 6 Drawing Sheets

METHOD AND APPARATUS FOR SCHEDULING PACKETS AND/OR CELLS

RELATED APPLICATION INFORMATION

The present application is continuation of U.S. application Ser. No. 12/178,839, filed Jul. 24, 2008, which is a continuation of U.S. application Ser. No. 11/029,624, filed Jan. 6, 2005, now U.S. Pat. No. 7,408,947 B2, the entire contents of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

The invention relates generally to scheduling of packets and/or cells in an input buffered switch, and, more particularly, to a packet and cell switching apparatus method using parallel switching units. Switching performance is improved by increasing the number of scheduled packets and/or cells per time period in a switching system using parallel switching units.

2. Description of the Related Art

With respect to the design of large-scale packet switches and routers, it is well known in the art that a pure output buffering strategy, while providing high switching efficiency, is not scalable as switch dimensions get larger. This is mainly due to the requirement that the switch core operates faster than the individual switch ports by a factor equivalent to the number of ports. For this reason, large capacity switches are generally of the "input buffered" variety, with the input and output port modules being interconnected via switch units such as crossbars. To overcome the input buffer head-of-line (HOL) blocking phenomenon, the buffer at each input port is organized into a set of input queues, and each input queue is dedicated for packets destined to a particular output port.

A general input queued switch has N input ports and M output ports, whereby N and M are integer values, in which each input port uses an input queue per output port, and whereby there are therefore N×M input queues in total. A scheduler identifies a set of matching input/output pairs between which packets or cells are transmitted via switch units without conflict. The throughput efficiency of this switch depends on the efficiency of the scheduling algorithm. For this reason, a variety of scheduling algorithms based on various forms of sub-optimal heuristics are currently employed in the industry.

Three widely known heuristic algorithms for scheduling traffic in input-queued switches are: Parallel Iterative Matching (PIM), Round-Robin Matching (RRM) and iSLIP. Each of these algorithms tries to maximize the matching efficiency by attempting to pick conflict free sets of inputs/output pairs, and, typically, multiple successive iterations are performed to improve the matching efficiency.

The PIM method consists of three steps: request, grant, and accept. At the request step, N×M input queues send requests to output ports. At the grant step, each output port randomly grants a request among received requests and notifies the result to each input port. An input port may receive a number of grants from output ports, but accepts only one randomly selected grant. Thus, the PIM method operates by randomly selecting a candidate input for each output port in a first output arbitration (grant step) phase. Then, in a second input arbitration (accept step) phase, the system resolves conflicts among the plurality of outputs that may be selected for each input, by employing a similar randomization strategy.

The RRM method achieves the same goals in a similar sequence of output and input arbitration phases as with the PIM method, except that the selections are made in a deterministic fashion using a round-robin arbitration pointer implemented at each output and input port.

The iSLIP method operates in a way similar to RRM, except that the movement of the output and input round-robin pointers is conditioned on successful matches, whereas it is unconditional in the case of RRM. The typical iSLIP method is described in detail in U.S. Pat. No. 5,500,858, issued to Nicholas McKeown.

In conventional switch devices, resource arbitration must be addressed. One such conventional resource arbitration method is described in detail in U.S. Pat. No. 5,267,235, issued to Charles Thacker, whereby a rapid one-to-one match between requesters and servers is performed, whereby each server selects one request, preferably in a random manner.

Another scheduling algorithm is described in U.S. Pat. No. 6,633,568, issued to Man Soo Han et al., whereby a two-dimensional round-robin scheduling algorithm is described, in which multiple selections are made in an input-buffered switch.

Yet another scheduling algorithm is described in U.S. Pat. No. 6,813,274, issued to Hiroshi Suzuki et al., which attempts to solve a problem with conventional scheduling method of only allowing one accept per input port, by allowing for multiple accepts per inputs.

For each of these conventional scheduling algorithms, a synchronization problem exists when a number of output ports generate a grant for an identical input port. These algorithms attempt to maximize the matching efficiency by performing multiple successive iterations, and in the worst case, the algorithm must be repeated N times to converge for an N.times.M switch. Furthermore, these multiple iterations decrease the switching performance in terms of scheduling decisions per time unit.

The present invention is directed to overcoming or at least reducing the effects of one or more of the problems set forth above.

SUMMARY OF THE INVENTION

According to at least one aspect of the invention, there is provided a method of scheduling data in a switch that includes a plurality of input ports each having at least one input queue, a plurality of switch units, and a plurality of output ports. The method includes: a) generating per input port a request to output data, to each of the output ports to which data is waiting at the input port to be sent to the output port, wherein the request identifies one of the plurality of switch units to be used in transferring data from the corresponding input port to the corresponding output port, the identified one of the plurality of switch units being identified according to a first priority scheme. The method also includes: b) granting access, per output port, per switch unit identified, to the requests made in step a), the granting being based on a second priority scheme. The method further includes: c) accepting grants per input port, per switch unit, the accepting being based on a third priority scheme. The method still further includes: d) outputting data from the respective input ports to the respective output ports, based on the accepted grants, utilizing the corresponding switch units identified in the accepted grants.

According to another aspect of the invention, there is provided a system for scheduling data. The system includes a switch that includes a plurality of input ports each having at least one input queue. The switch also includes a plurality of switch units that are communicatively connected to the plurality of input ports. The switch further includes a plurality of output ports that are communicatively connected to the plurality of switch units. The switch also includes a scheduler that is configured to: a) per input, generate a request to output data stored in an input queue of each of the input ports, to each of the output ports to which data is to be sent, wherein the request includes identifying which of the plurality of switch units are to be used in a transfer of data from the corresponding input ports to the corresponding output ports, the identified ones of the plurality of switch units being identified according to a first priority scheme; b) grant access, per output port, per switch unit identified, to the generated request, the granting being based on a second priority scheme; c) accept a grant per input port, per switch unit, the accepting being based on a third priority scheme; and d) instruct the corresponding input port to output data from the corresponding input queue of the corresponding ones of the input ports to the corresponding ones of the output ports, based on the accepted grant, by utilising the corresponding switch units identified in the accepted grant.

According to yet another aspect of the invention, there is provided a method of scheduling packets or cells for a switch that includes a plurality of input ports each having at least one input queue, a plurality of switch units, and a plurality of output ports. The method includes: a) generating per input port a request to output data, to each of the output ports to which data is waiting at the input port to be sent to the output port, wherein the request includes identifying one of the plurality of switch units to be used in a transfer of the packet or cell from the corresponding input port to the corresponding output port, the identified one of the plurality of switch units being identified according to a first priority scheme. The method also includes: b) granting access, per output port per at least one of said switch units, to the requests made in step a), the granting being based on a second priority scheme. The method further includes: c) accepting grants per input port per at least one of said switch units, the accepting being based on a third priority scheme. The method still further includes: d) outputting packets and/or cells from the respective input ports to the respective output ports, based on the accepted grants, utilizing the corresponding switch units identified in the accepted grants.

According to another aspect of the invention, there is provided a system for scheduling packets or cells. The system includes a switch that includes a plurality of input ports each having at least one input queue. The switch also includes a plurality of switch units that are communicatively connected to the plurality of input ports. The switch further includes a plurality of output ports that are communicatively connected to the plurality of switch units. The switch system still further includes a scheduler that is configured to: a) receive a request generated by at least one of the input units, the request being made to output data stored in an input queue of the input ports, to each of the output ports to which data is to be sent, wherein the request includes identifying which of the plurality of switch units are to be used in a transfer of the packet or cell from the corresponding input ports to the corresponding output ports, the identified ones of the plurality of switch units being identified according to a first priority scheme; b) grant access, per output port per at least one of said switch units, to the requests made in step a), the granting being based on a second priority scheme; c) accept grants per input port per at least one of said switch units, the accepting being based on a third priority scheme; and d) output packets and/or cells from the respective input ports to the respective output ports, based on the accepted grants, utilizing the corresponding switch units identified in the accepted grants.

DETAILED DESCRIPTION

The present embodiments are directed to switching systems and methods having parallel switching units, whereby switching performance is improved by allowing each output port to generate multiple grants per scheduler iteration, and by allowing each input port to accept multiple grants per scheduler iteration. This is different from conventional scheduling algorithms such as iSLIP, PIM and RRM, which only allow for the generation and acceptance of a single grant per scheduler iteration per output and input port, respectively.

Compared to the conventional scheduling algorithms, a method and apparatus according to at least one embodiment of the invention changes the request step to specify per request which one of the multiple parallel switch units is requested; it changes the grant step to allow for the generation of up to one grant for each of the parallel switch units per output port, and it changes the accept step to allow for the acceptance of up to one grant for each of the parallel switch units per input port. This means that each input and output port can switch multiple packets or cells per scheduler iteration, which increases the number of packet or cell scheduling decisions per time unit. This consequently increases the schedulers matching efficiency and the switching capacity of a switching system using parallel switch units.

Furthermore, a method and apparatus according to at least one embodiment of the invention allows for a reduction of packet and cell tax switching inefficiencies, since the time period per switching decisions is reduced. Still further, a method and apparatus according to at least one embodiment of the invention provides for the capability of switching both variable size packet and fixed-size cells without resorting to packet fragmentation and reassembly.

Figure 1:
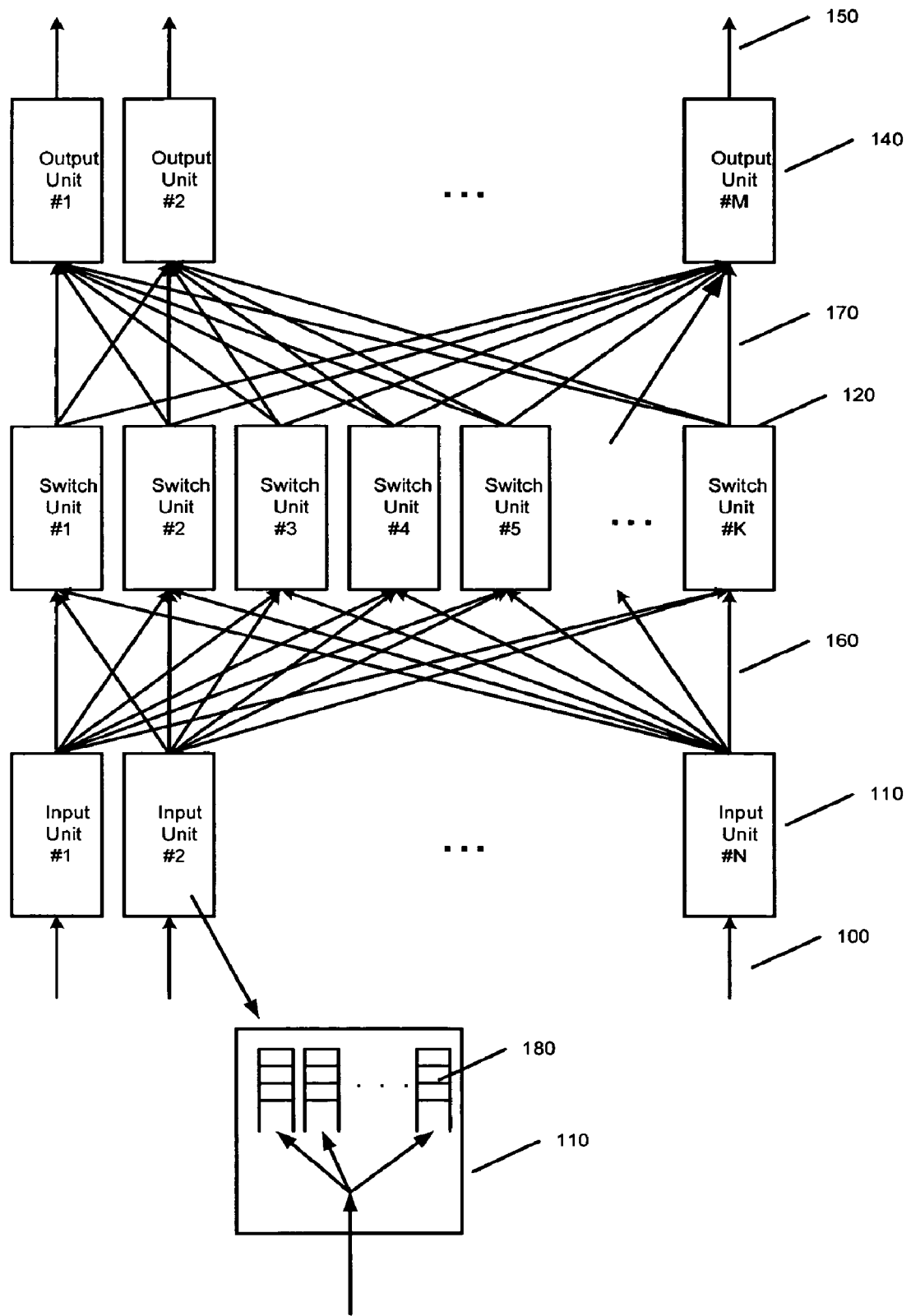
FIG. 1 shows a switching system according to a first embodiment of the invention.

FIG. 1 shows an N.times.M port switching apparatus (N and M are integer values) incorporating a scheduling method and apparatus according to at least one embodiment of the present invention. Each of the N input ports 100 receives packet and/or cells and buffers them in input queues 180 according to their output port destination, which is one of the M output ports 150 respectively connected to the M output units 140 by way of output links 150. Each input unit 110 and output unit 140 connects to a number (K) of parallel switch units 120.

The input units 110 connect to the switch units 120 via input links 160, and the output units 140 connect to the switch units 120 via output links 170. Input unit #1 connects to input #1 on each of the K parallel switch units 120, input unit #2 connects to input #2 on each of the K parallel switch units 120, . . . , and input unit #N connects to input #N on each of the K parallel switch units 120. Similarly, output unit #1 connects to output #1 on each of the K parallel switch units 120, output unit #2 connects to output #2 on each of the K parallel switch units 120, . . . , and output unit #N connects to output #N on each of the K parallel switch units 120. The switch units are functionally distinct from one another by functioning in parallel to one another as described below. Exemplary ways to actually set up the scheduler units are described below.

The scheduling method of an embodiment of the present invention is preferably incorporated into a scheduler unit, and the scheduler unit may by implemented in any of the input units 110, the output units 140 or the switch units 120. Alternatively, the scheduler unit may be incorporated into a separate unit not specifically shown in FIG. 1. In one possible implementation, the scheduler unit is incorporated into one of the switch units 120 or as a separate unit. The scheduler unit performs the scheduling of the packets and/or cells from the input queues 180, across the switch units 120, for switching to an output unit 140, before final forwarding to their destination output port 150.

Figure 2:
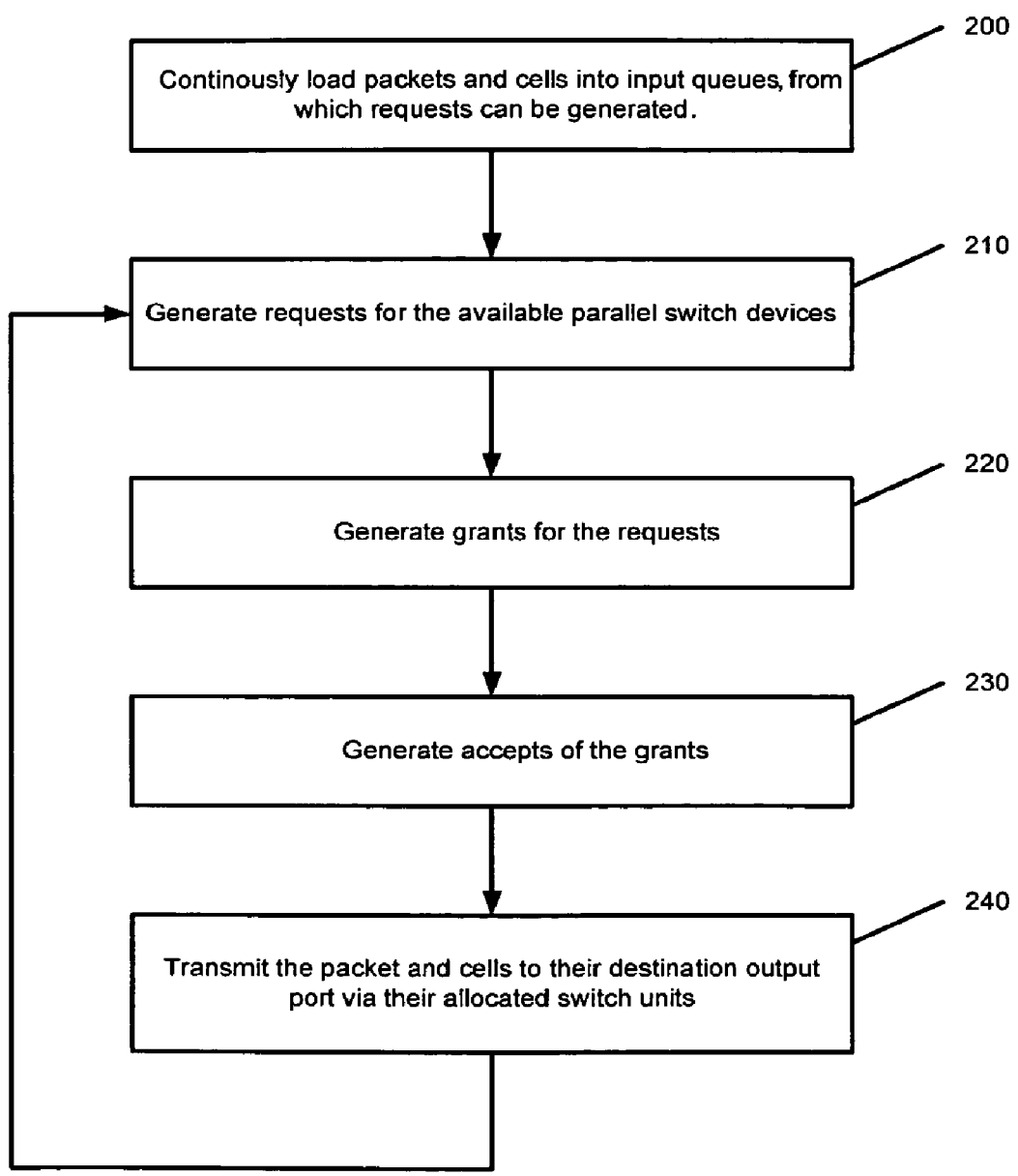
FIG. 2 shows steps involved in a scheduling method according to an embodiment of the invention.

FIG. 2 is a flowchart showing steps performed by a scheduling method according to a first embodiment of the invention. The first step 200 is to continuously load the packets and/or cells arriving at the input ports into input queues from which requests for specific output ports can be generated. The next step 210 is to request access to the specific output port for each packet or cell existing at the front of each input queue. The next step 220 is to grant output ports to the requests. The next step 230 is for the input ports to accept grants from the output ports. The next step 240 is to generate input-to-output switch link allocation decisions and transmit the packets/cells to their destination output port via the switch units. The process is then repeated, whereby it returns back to step 210 to schedule another cell or packet.

Each of the three steps is performed in the first embodiment once per scheduler iteration, whereby each step is described in detail below.

Step 1 (request step): Each input port generates a request to all output ports for which it has data waiting in an input queue. Each request from an input to output port specifies a specific switch unit, and each input port uses a rotating priority scheme per output port to select which one of the parallel switch units to request for the output port.

The rotating priority scheme selects the switch unit with the highest priority. Thereafter, the designation of the highest priority is incremented, causing the highest priority element of the last iteration to become the lowest priority element in the following iteration. Preferably, the increment step is only executed if the request resulted in a grant generation in step 2 which was consequently accepted in step 3, since this produces a desirable de-synchronization effect between the switch unit selection decisions performed by the scheduler.

A difference between the request step performed in the first embodiment and the request step in the conventional PIM, iSLIP or RRM methods is that, for these conventional methods, all requests generated by any input port are always for the same and single switch unit, while in the method according to the first embodiment, the request is for one of a number of parallel switch units. Also, in the first embodiment, a rotating priority scheme is used to identify which one of the parallel switch units is requested per request per output port. The rotating priority scheme utilized in the first embodiment may be a round robin priority scheme, or some other type of priority scheme that keeps track of assignments made between input units, switch units and output units in previous scheduling iterations. For example, a random priority scheme is explained in a later section, with respect to a different embodiment of the invention.

Step 2 (grant step): After the request step, access is granted per output port per switch unit. A rotating priority scheme is used per output port per switch unit to select a request from an input port, similar to the rotating priority scheme previously described with respect to the request step (step 1). A rotating priority scheme only considers requests which were made specifically for the corresponding switch unit. Preferably, the increment step is only executed if the grant is correspondingly accepted in step 3, since this produces a desirable de-synchronization effect between the grant selection decisions performed by the scheduler.

All of the generated grants from a particular output port are for different input ports, since each input port can only request a single switch unit per output port.

A difference between the grant step performed in the first embodiment, as compared to the grant step in the conventional PIM, iSLIP or RRM methods is that, in these conventional methods, each output port only grants access for a single input port, while in the method according to the first embodiment each output port can grant access for an input port for each of the parallel switch units. In other words, according to at least one embodiment of the invention, an output port can effectively grant access to multiple input ports through the use of parallel switch units.

Step 3 (accept step): After the grant step, the next step is to accept grants per input port per switch unit. A rotating priority scheme is used per input port per switch unit to select a grant from an output port, similar to the rotating priority scheme previously described. A rotating priority scheme only considers grants made specifically for the corresponding switch unit. After the accept decision, the priority is incremented by one value beyond the accepted priority element.

Note that all of the accept decisions made for a particular input port are for different output ports, since each output port can only grant a single switch unit per input port.

A difference between the accept step of the first embodiment, as compared to the accept step in the conventional PIM, iSLIP or RRM methods is that, in these conventional methods, each input port only accepts a single grant from an output port, while in the method according to the first embodiment each input port can accept a grant from an output port for each of the parallel switch units. In other words, according to at least one embodiment of the invention, an input port can effectively accept grants from multiple output ports through the use of parallel switch units.

After step 3, the final processing is to allocate the corresponding input and output switch unit links according to the accepted grants in step 3, and transmit the corresponding packets and/or cells to their destination output ports via their corresponding allocated switch units.

If the switching apparatus only implements a single switch unit, i.e., there are no parallel switch units, the operation of the method according to the first embodiment becomes analogous to the operation of the iSLIP scheduler algorithm, except that in one possible implementation of the first embodiment, the scheduler can be used to switch variable size packets without resorting to packet fragmentation/reassembly, unlike iSLIP which is only applicable to the switching of cells (fixed-size packets). Application of an embodiment of the invention to switch both variable size packets and fixed-size cells is found below.

The following examples further illustrate the operation of the various embodiments of the present invention.

Figure 4:
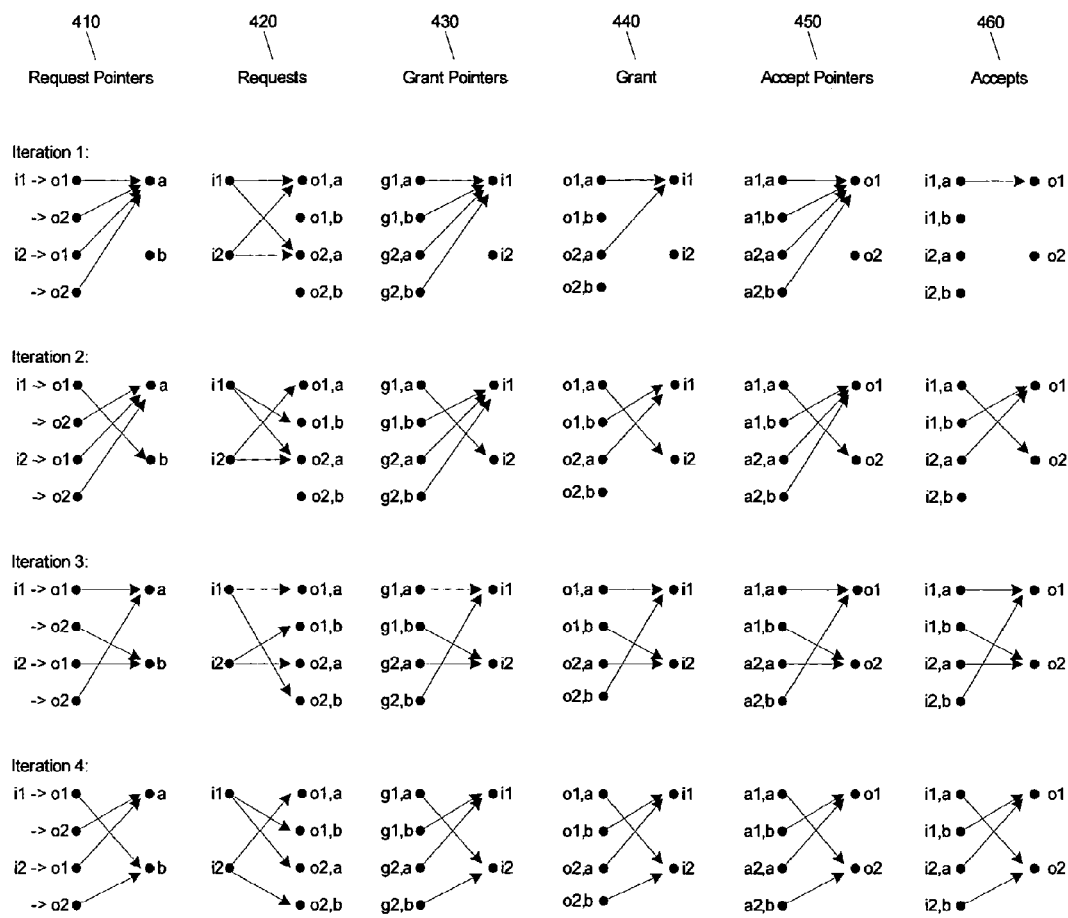
FIG. 4 shows four iterations of processing performed by a scheduling device according to an embodiment of the invention.

FIG. 4 illustrates four iterations of the scheduling method of FIG. 2, performed for a switching system with two input ports, two output ports, and where two parallel switch units labeled a and b connect the input ports to the output ports. This example system corresponds to a system where N=2, M=2 and K=2 as defined by FIG. 1. Also shown in FIG. 4 are the request pointers 410, the requests 420, the grant pointers 430, the grants 440, the accept pointers 450, and the accepts 460.

FIG. 4 illustrates, per iteration, a request step corresponding to step 210 in FIG. 2, a grant step corresponding to 220 in FIG. 2, and an accept step corresponding to 230 in FIG. 2. At the beginning of each of the four iterations, each input unit 110 has data waiting in an input queue 180 for every output unit 140 (and thus, for every output port) in the system.

The request generation for the scheduling method shown in FIG. 4 is performed using a two value rotating priority scheme per (input, output) port combination to select which of the switch units a and b shall be requested. The grant generation is performed using a two value rotating priority scheme per output port on switch units (a, b) to select a request from input port 1 or 2. The accept generation is performed using a two value rotating priority scheme per input port on switch units (a, b) to select a grant from output port 1 or 2.

The processing during iteration 1 begins with each input requesting access to outputs 1 and 2, and the rotating priority scheme determines for each request whether the request is made for switch unit a or b, as determined by the value of the request pointers 410. Input 1 requests output 1 via switch unit a, and output 2 via switch unit a. Input 2 requests output 1 via switch unit a, and output 2 via switch unit a. The request pointers 410 are all pointed to switch a in iteration 1.

After the request step follows the grant step, where each output on switch units a, b selects a request from an input port, and the rotating priority scheme determines for each output on switch units a and b, whether the grant is made for input 1 or 2, as determined by the value of the grant pointers 430. Output 2 grants to input 1 via switch unit a, and output 1 grants to input 1 via switch unit a.

After the grant step follows the accept step, where each input on switch units a, b selects a grant from an output port, and the rotating priority scheme determines for each input on switch units a and b, whether the accept is made for output 1 or 2, as determined by the value of the accept pointers 450. Input 1 accepts a grant from output 1 via switch unit a, and the corresponding cell or packet is then transmitted to its destination output port via switch unit a.

The processing now continues to iteration 2. Due to the processing result in iteration 1, the request pointer for (input 1, output 1) has now been incremented from switch unit a to b, while the other request pointers which did not result in an accept in step 3 (step 230 in FIG. 2) remain at the same value as at the beginning of iteration 1. The grant pointer for output 1 on switch unit a has been incremented from input 1 to input 2, while the other grant pointers which did not result in an accept in step 3 (step 230 in FIG. 2) remain at the same value as at the beginning of iteration 1. The accept pointer for input 1 on switch unit a has been incremented from output 1 to output 2, while the other accept pointers which did not result in an accept in step 3 (step 230 in FIG. 2) remain at the same value as at the beginning of iteration 1.

The request step for iteration 2 is the same as for iteration 1, except that input 1 requests output 1 via switch unit b, because of the request pointer update performed in iteration 1. In the grant step, grants are made both to input 1 and input 2, and input 1 receives grants via both switch units a and b, because of the update of the request and grant pointers in iteration 1, and all of the grants are accepted in the accept step again due to the pointer updates that occurred in iteration 1.

Figure 5:
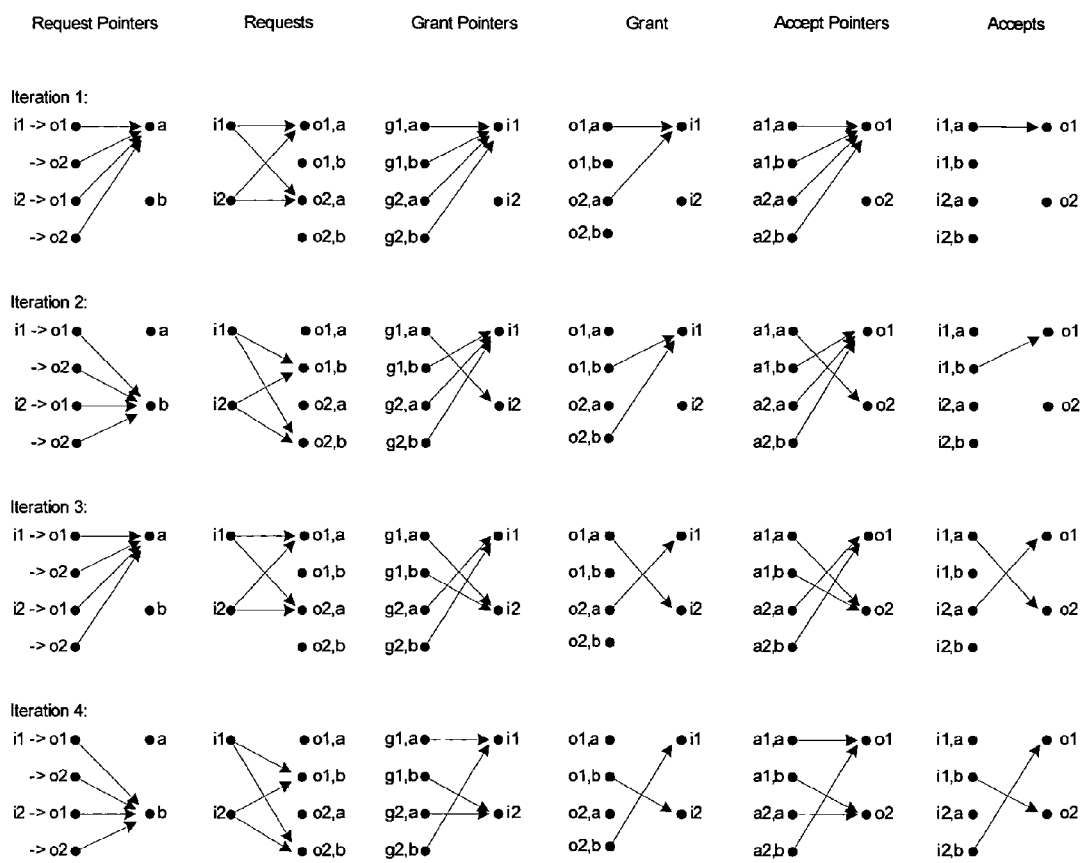
FIG. 5 shows four iterations of processing performed by a scheduling device according to another embodiment of the invention.

FIG. 5 shows a sub-optimal scheduling method according to a second embodiment of the invention, to show the advantage of de-synchronization of the request pointers. In FIG. 5, the request pointers are always automatically updated per iteration, while in FIG. 4 the request pointers are only updated if the corresponding request was accepted within the same iteration. By comparing FIG. 4 and FIG. 5, it can be seen that the de-synchronization of the request pointers leads to a higher matching efficiency per iteration, a desirable feature of the first embodiment.

It can be observed that, in the method according to the first embodiment, an input will continue to request an output port via a specific switch unit, until the request is finally granted, which results in a desirable de-synchronization effect with respect to which of the parallel switch units are selected by different inputs port requesting the same output port. The more evenly the distribution of the parallel switch units for the corresponding generated requests, the better the matching efficiency per iteration, since a larger number of the parallel switch units can be matched per scheduler iteration.

The overall methodology of the invention according to the first embodiment has been described in detail hereinabove. The following discussion describes different options and approaches for implementing the embodiments of the invention.

Figure 3:
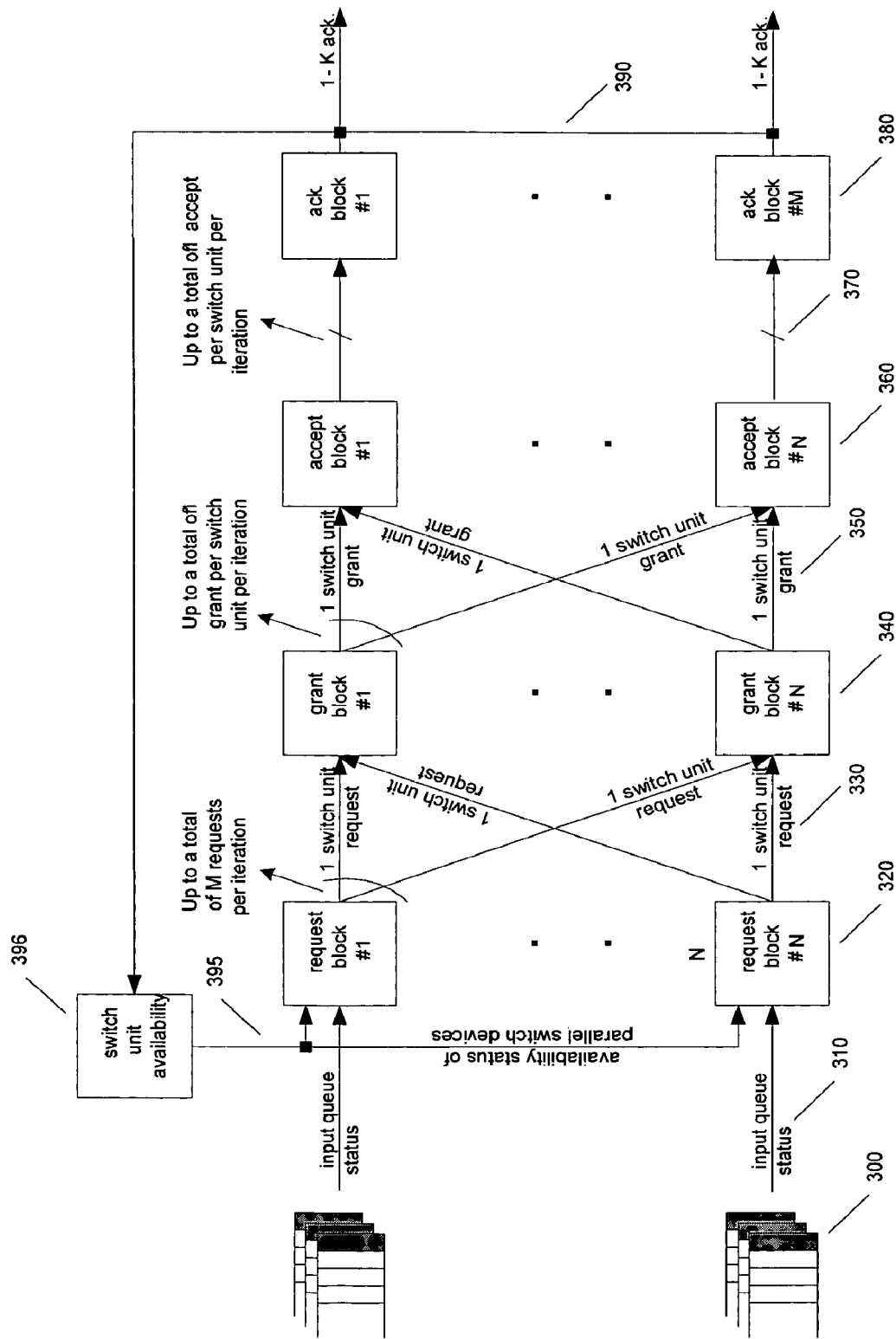
FIG. 3 shows a block diagram of a scheduling device according to an embodiment of the invention.

FIG. 3 is a block diagram illustrating one possible embodiment of a scheduler unit according to a third embodiment of the present invention. In one possible implementation, each of the blocks shown in FIG. 3 is implemented in software; alternatively, some of the features performed by the blocks may be performed by hardware, such as by schematic design or by a hardware description language (HDL) and implemented in a programmable logic device (e.g., field programmable gate array/CPLD or an application specific integrated circuit. The scheduler according to the third embodiment may be configured to perform the methods according to any of the embodiments described hereinabove or hereinbelow. The queue status 310 per input queue per input 300 is forwarded to a request block 320, which is implemented per input port in the system shown in FIG. 1. Each request block 320 is connected to a grant block 340, which is implemented per output port in the system shown in FIG. 1. Each connection from a request block 330 to a grant block 340 can carry a single request 330 for one of the parallel switch units, and a request block 320 may generate up to a total of one request for each grant block 340 per scheduler iteration.

Each grant block 340 is connected to an accept block 360 which is implemented per input port in the system shown in FIG. 1. Each connection from a grant block to an accept block can carry a single grant 350 for one of the parallel switch units, and a grant block 340 may generate up to a total of one grant for each parallel switch unit per scheduler iteration. Each accept block 360 is connected to a acknowledge block 380, which is implemented per input port in the system shown in FIG. 1. Each connection from an accept block to an acknowledge block can carry up to one accept 370 for each of the parallel switch units in the system shown in FIG. 1, and an accept block 360 may generate up to a total of one accept for each parallel switch unit per scheduler iteration.

The acknowledge block 380 performs the processing of step 240 shown in FIG. 2, which controls the transmission of the corresponding packets and cells from the input queues to their corresponding destination output ports via the allocated switch units by generation of acknowledge commands which are passed back to the input queues to initiate the transmission of the head-of-line (HOL) packet or cell elements from the corresponding input queues. The acknowledge blocks are also connected to a switch unit availability block 396, which maintains the allocation status of all switch unit input and output links (160 and 170 in FIG. 1). After allocation of input and output links, the availability status for the allocated input and output links are updated according to the length of the individual packets or cells. In the preferred embodiment, the size of the packets and cells is not used by step 1, 2 or 3, but only by the switch unit availability block 396.

If the cells and packets have variable size, the switch unit allocation block 396 in FIG. 3 maintains input and output link status per individual link in the system as a function of the length of each transmitted individual packet or cell, as is done in a third embodiment of the invention. In the request step for the third embodiment, only switch units for which a corresponding input link-to-output link is available are considered by the rotating priority scheme selection of a switch unit. Otherwise, all of the other steps are the same as the first embodiment described previously.

Alternatively, if the packets and cells all have the same size (i.e. fixed size packets/cells), the switch unit availability block 396 in FIG. 3 is not required. In such a case, all input and output links are simply considered available at the beginning of request step 1, and the period of time it takes to generate a set of allocation decisions is aligned as close as possible to the transmission period of a fixed-size cell/packet unit on an input or output link.

The scheduler shown in FIG. 3 has some general similarities to a conventional iSLIP scheduler, whereby some of the differences between the scheduler shown in FIG. 3 and an iSLIP scheduler are described in detail below. In the iSLIP scheduler algorithm, each connection between a request and a grant block does not identify a specific switch unit (since there is only a single switch unit available), but rather only indicates whether or not a request is present. Also, in the iSLIP scheduler algorithm, each connection between a grant and an accept block does not identify a specific switch unit (since there is only a single switch unit available), but rather only indicates whether or not a grant is present. Furthermore, the number of grants generated per grant block per scheduler iteration is also different for the scheduler shown in FIG. 3 as compared to the iSLIP method, since iSLIP generates a single grant per scheduler iteration, while the scheduler according to FIG. 3 generates up to one grant per parallel switch unit per scheduler iteration. This difference also exists for the connection between an accept block and an acknowledge block.

As an alternative to the scheduler of the third embodiment shown in FIG. 3, in a fourth embodiment, a scheduler performs the selection of the switch unit in the grant block as part of the grant step, and not in the request block as part of the request step. In the fourth embodiment, the rotating priority switch unit request pointers defined per (input, output) port combination are maintained and updated by the grant block and not by the request block. For the fourth embodiment, the switch unit availability feeds into the grant block, rather than into the request blocks as shown in FIG. 3.

Figure 6:
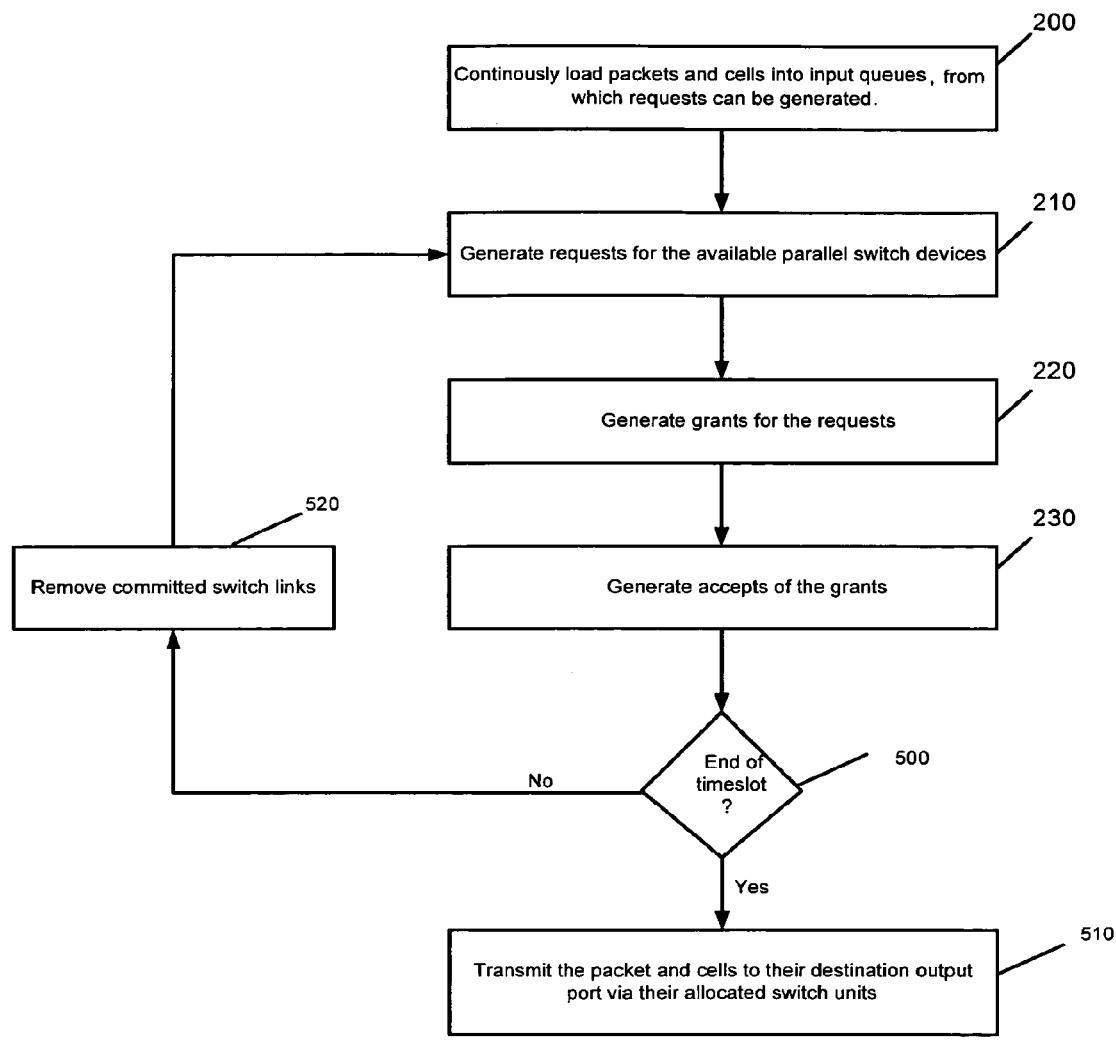
FIG. 6 shows steps involved in a scheduling method according to another embodiment of the invention.

FIG. 6 is a flowchart showing a scheduling method according to a fifth embodiment of the invention, which uses multiple iterations per scheduler allocation decision period. In general, the method according to the fifth embodiment is consistent with the method described in relation to the first embodiment as shown in FIG. 2. However, the method of FIG. 2 assumes that only a single iteration that corresponds to the request, grant, and accept steps is performed during a scheduler allocation decision period, i.e., the timeslot period between the generation of scheduler allocation decisions. The method of FIG. 6 tests, in step 500, to determine if the end of a timeslot has been reached or is within a threshold range of termination. If yes, the corresponding packets and/or cells are transmitted to their destination output ports via their corresponding allocated switch units, in step 510. If no, committed input and output links of the parallel switch units are masked out in step 520, and a new iteration is performed. In other words, if a request has been allocated an input-to-output switch path, the request is not considered in the following iteration.

A sixth embodiment of the scheduling method according to the present invention extends the basic techniques of the invention to include requests at multiple priority levels. In the sixth embodiment, each input unit maintains a separate input queue for each priority level established per output port. This means that for an N×M switch with P priority levels (P being an integer value), each input unit maintains P×M queues. The prioritized technique utilized in the sixth embodiment may be defined as follows:

Step 1 (request step): Each output port request is extended to include a priority level. When an input generates a request for a particular switch unit for a particular output port, the priority of the request is set equal to the highest priority non-empty input queue associated with the particular output port.

Step 2 (grant step): When an output port receives request for a particular switch unit, it determines the highest priority level of the requests, and the output port then grants one request among the received requests with that determined priority level. The output port uses the same rotating priority scheme as before per priority level per switch unit. When a grant is passed to the input port, the grant includes the selected priority level. As before, the increment step is only executed if the grant is correspondingly accepted in step 3 (step 230 in FIG. 2).

Step 3 (accept step): When an input port receives grants for a particular switch unit, it determines the highest priority level of the grants, and the input port then accepts one grant among the received grants with that determined priority level. The input port uses the same rotating priority scheme as before per priority level per switch unit. This operation is performed for each of the parallel switch units per input port as before.

A seventh embodiment of the present invention implements a number of rotating priority grant mechanisms which is less than one rotating priority grant mechanism per switch unit per output port. In other words, the seventh embodiment uses less than K rotating priority grant mechanisms (K being the number of switch units) per output port, since a single rotating priority grant mechanism can be used to cover two or more switch units. Thus, one can implement anywhere from 2 to K rotating priority grant mechanisms per output port.

In the seventh embodiment, a rotating priority request selection for a given output port selects between requests from input ports for a set of parallel switch units, as opposed to selecting between requests for a single switch unit only. The number of switch units in the set covered by a rotating priority request selection can be in the range from two to the number of parallel switch units, depending on the implementation. The maximum number of grants which can be generated per output per scheduling iteration is equal to the number of rotating priority request selections performed per output port. The multiple rotating priority request selections performed for an output port does not need to cover an identical number of parallel switch units. For each grant which is generated as a result of a rotating priority request selection, the switch unit associated with the grant is set equal to the switch unit of the selected request.

An eighth embodiment of the invention implements a number of rotating priority accept mechanisms which is less than one rotating priority accept mechanism per switch unit per input port. In other words, the eighth embodiment uses less than K rotating priority accept mechanisms (K being the number of switch units) per input port, since a single rotating priority accept mechanism can be used to cover two or more switch units. Thus, one can implement anywhere from 2 to K rotating priority accept mechanisms per input port.

In the eighth embodiment, a rotating priority grant selection for a given input port selects between grants from output ports for a set of parallel switch units, as opposed to selecting between grants for a single switch unit only. The number of switch units in the set covered by a rotating priority grant selection can be in the range from two to the number of parallel switch units depending on the implementation. The maximum number of accepts which can be generated per input per scheduling iteration is equal to the number of rotating priority grant selections performed per input port. The multiple rotating priority grant selections performed for an input port does not need to cover an identical number of parallel switch units. For each accept which is generated as a result of a rotating priority grant selection, the switch unit associated with the accept is set equal to the switch unit of the selected grant.

A ninth embodiment of the invention implements a number (e.g., R, where R is an integer value) of rotating priority grant mechanisms which is less than one rotating priority grant mechanism per switch unit per output port, and a number (e.g., S, where S is an integer value) of rotating priority accept mechanisms which is less than one rotating priority grant mechanism per switch unit per input port. In the ninth embodiment S may be set equal to R, or they may have different values, depending upon the particular implementation.

A tenth embodiment of the invention is similar to the first embodiment in most respects, but whereby it utilizes a "random selection" priority scheme instead of a rotating priority scheme. In the tenth embodiment, in step 1 (requesting step), each input port randomly selects uniformly across all parallel switch units which one of the parallel switch units to request for the output port. In step 2 (granting step), each output port per switch unit randomly selects a request uniformly over all received requests. In step 3 (accepting step), each input port per switch unit randomly selects a grant uniformly over all received grants. The "random selection" scheme may also be utilized with other embodiments of the invention, as an alternative to the "rotating priority" scheme that was described with respect to those other embodiments.

Thus, apparatuses and methods have been described according to the various embodiments of the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention. The scheduling method and system according to any of the embodiments of the present invention can be utilized in a network interconnect crosspoint architecture and method, such as the one described in U.S. patent application Ser. No. 10/898,540, filed Jul. 26, 2004, which is incorporated in its entirety herein by reference.

It is claimed:

1. A method of switching data using a switch that includes a plurality of input ports each having at least one input queue, a plurality of switch units, and a plurality of output ports, the method comprising:
   a) each input port having data to be sent to one or more output ports stored in an input queue generating a request to each of the one or more output ports to which data in the input port is to be sent, wherein each request identifies one of the plurality of switch units for use in transferring data from the requesting input port to the corresponding output port;
   b) generating grants per output port per switch unit, each grant corresponding to one of the requests generated in step a);
   c) accepting grants per input port per switch unit; and
   d) outputting data from the respective input ports to the respective output ports, based on the accepted grants, utilizing the switch units identified in the requests corresponding to the accepted grants.

2. The method according to claim 1, wherein each of the switch units has N input ports and M output ports, N and M being positive integers, and wherein each of the switch units is capable of switching a packet or cell from any one of the N input ports to any one of the M output ports.

3. The method according to claim 2, wherein each of the switch units is a crossbar switch.

4. The method according to claim 1, wherein the switch units are disposed in a parallel relationship with respect to each other.

5. The method according to claim 1, wherein generating grants further comprises generating multiple grants per output port up to a maximum of one grant per switch unit per output port.

6. The method according to claim 1, wherein accepting grants further comprises accepting multiple grants per input port up to a maximum of one grant per switch unit per input port.

7. The method according to claim 1, further comprising:
   in step a), selecting a switch unit to be identified in each request based on priority values assigned to the switch units;
   after the respective grants have been accepted in step c), assigning priority values to the switch units such that switch units utilized in the accepted grants have a lower priority value with respect to the switch units that were not utilized in accepted grants; and
   repeating the method from step a).

8. A switching system, comprising:
   a plurality of input ports each having at least one input queue;
   a plurality of switch units that are communicatively connected to the plurality of input ports;
   a plurality of output ports that are communicatively connected to the plurality of switch units; and
   a scheduler configured to:
      a) receive requests generated by one or more of the input ports, each request being made to output data stored in an input queue of an input port to one of the output ports, wherein each request identifies one of the plurality of switch units for use in transferring data from the requesting input port to the corresponding output port;

b) generate grants per output port per switch unit, each grant corresponding to one of the requests received in step a);
c) accept grants per input port per switch unit; and
d) instruct the corresponding input ports to output the data from the corresponding input queues of the corresponding input ports to the corresponding output ports, based on the accepted grants, utilizing the switch units identified in the requests corresponding to the accepted grants.

9. The switching system according to claim 8, wherein each of the switch units has N input ports and M output ports, N and M being positive integers, and wherein each of the switch units is capable of switching a packet or cell from any one of the N input ports to any one of the M output ports.

10. The switching system according to claim 9, wherein each of the switch units is a crossbar switch.

11. The switching system according to claim 8, wherein the switch units are disposed in a parallel relationship with respect to each other.

12. The switching system according to claim 8, wherein the scheduler is further configured to generate multiple grants per output port up to a maximum of one grant per switch unit per output port.

13. The switching system according to claim 8, wherein the scheduler is further configured to accept multiple grants per input port up to a maximum of one grant per switch unit per input port.

* * * * *